(12) United States Patent
Wall et al.

(10) Patent No.: US 7,028,288 B2
(45) Date of Patent: Apr. 11, 2006

(54) INPUT FIELD CONSTRAINT MECHANISM

(75) Inventors: Peter M. Wall, New York, NY (US); Anders M. Holmgren, Nth Balgowlah (AU)

(73) Assignee: Sun Microsystems, Inc., Santa Clara, CA (US)

( * ) Notice: Subject to any disclaimer, the term of this patent is extended or adjusted under 35 U.S.C. 154(b) by 648 days.

(21) Appl. No.: 10/161,515

(22) Filed: Jun. 3, 2002

(65) Prior Publication Data

US 2003/0226115 A1 Dec. 4, 2003

(51) Int. Cl.
*G06F 9/44* (2006.01)
*G06F 17/00* (2006.01)

(52) U.S. Cl. ...................... 717/109; 715/507
(58) Field of Classification Search ................ 717/108, 717/109, 116, 120; 715/505–508, 780
See application file for complete search history.

(56) References Cited

U.S. PATENT DOCUMENTS

| | | | |
|---|---|---|---|
| 6,654,932 B1 * | 11/2003 | Bahrs et al. ................ | 715/507 |
| 2003/0078949 A1 * | 4/2003 | Scholz et al. ............... | 707/505 |

OTHER PUBLICATIONS

Brett McLaughlin, Validation with Java and XML Schema, Parts 1-4, JavaWorld, Sep. 2000.*
Krasner, Glenn E. and Pope, Stephen T.; "*A Description of the Model-View-Controller User Interface Paradigm in the Smalltalk-80-System*;" Journal; 1988; pp. 1-34; ParcPlace Systems, Inc.; Mountain View, CA USA.
Fialli, Joe; "*JSR 31: XML Data Binding Specification*;" Article; Aug. 23, 1999; pp. 1-5; Sun Microsystems, Inc.; Mountain View, CA USA.
Sperberg-McQueen, C.M. and Thompson, Henry; "*W3C Arhitecture Domain: XML Schema*;" Article; Mar. 22, 2002; pp. 1-6; Rev. 1.68; http://www.w3.org/XML/Schema; USA.

* cited by examiner

*Primary Examiner*—Kakali Chaki
*Assistant Examiner*—Trenton J. Roche
(74) *Attorney, Agent, or Firm*—Osha Liang LLP

(57) ABSTRACT

A method of automating enforcement of a data validation rule associated with an input field by a Model View Controller software application includes applying an input constraint embodying the data validation rule to a Model to generate an applied constraint, discovering the applied constraint via examination of the Model by a View-Controller Generator to generate a discovered constraint, generating an input field constraint mechanism using the discovered constraint, and constraining the input field using the input field constraint mechanism to generate a constrained input field.

21 Claims, 6 Drawing Sheets

INPUT FIELD CONSTRAINT MECHANISM

BACKGROUND OF INVENTION

Design patterns are used in software design to enhance the quality and robustness of software applications. Design patterns are arrangements of classes and objects. An example of a design pattern is a Model View Controller (MVC) design pattern. A software application that includes classes organized as an MVC design pattern (an "MVC software application") separates the user interface of the MVC software application from the core functionality of the MVC software application.

The separation of an MVC software application into a Model, a View, and a Controller enhances the quality and robustness of the MVC software application. Typically, each of the Model, the View, and the Controller is a collection of one or more objects and classes.

The Model manages the core functionality of the MVC software application. The View manages that portion of the MVC software application that is visible to a user on a computer display device, e.g., an area of the computer screen known as a graphical user interface (GUI). The Controller performs actions on the Model which may result in changes to the View, or performs actions on the View directly.

Each View has one associated Controller and each Controller has one associated View. In general, each Controller-View pair is associated with a single Model. However, the Model may be associated with many Controller-View pairs. For example, a block diagram shown in FIG. 1 illustrates a single Model (80) associated with two different Controller-View pairs (90, 92) where one View (82) presents data managed by the Model (80) as a table (86), and another View (82) presents the data as a chart (88).

As with most object-oriented models, the View, the Controller, and the Model communicate by sending messages among Model objects, View objects, and Controller objects. FIG. 2 illustrates an example of the flow of communication between the View, the Controller, and the Model using messages. In this example, a user inputs a change via an input device (100) to data (102) managed by a Model (80). As a result, a Controller (84) sends a first message (104) to the Model (80). Sending the first message (104) causes the data (102) managed by the Model (80) to change, triggering two second messages (106, 109) from the Model (80), notifying all View and Controller objects (107) that have registered as a listener of the change. As a result of the notification, data output to one or more GUI windows (108) may be updated by the affected View-Controller pairs (107), if needed. Subsequently, the View (82) and the Controller (84) as a pair, each send a third message (110, 111) to the Model (80) retrieving updated data and reflecting the changed data in the GUI windows (108) managed by the View (82).

Messages sent among Model objects, View objects, and Controller objects may be implemented via multiple techniques. For example, a View object may send a message in order to obtain a value of a field of a Model object by invoking a method of the Model object, such as the following: statusValue=modelObjectA.getStatus( ).

Those skilled in the art will realize that allowing the View object to access the getStatus( ) method of modelObjectA may be accomplished through multiple techniques, e.g., setting an access protection level for the getStatus( ) method appropriately.

Design patterns, such as the MVC design pattern, may be used to help manage data collected from users of MVC software applications. For example, an MVC software application may present a GUI to a user in order to collect data from the user. Input fields of the GUI (e.g., textboxes) receive data entered by the user. Certain input fields may be designated as receiving certain types of data. For example, an input field labeled as "Zip Code" may receive numeric data, an input field labeled "Name" may receive alphabetic data, and an input field labeled "Address" may receive alphanumeric data. However, due to human error or other causes, an input field occasionally receives data of a type other than what the input field is meant to receive. For example, the input field labeled "Zip Code" may accidentally receive alphabetic data.

Data validation is used by software applications, such as MVC software applications, in order to ensure that data entered into an input field is of a correct type, or is of a correct range, or possesses certain desired characteristics. In an MVC application, because core functionality is intrinsic to the Model, data validation is performed by the Model. In order to perform data validation of data entered into an input field, the Model contains data validation rules, which are usually expressed as programmed comparison statements. Data validation rules may extend to cover other aspects of data entry besides data type and value (e.g., ensuring that the "Zip Code" input field receives only numeric data, or that a number input into an input field falls between certain desired values). For example, a data validation rule may ensure that every input field on a GUI be completed by the user.

As an example of a typical data validation scenario with an MVC software application, a user may type the word "Joe" into the "Zip Code" input field. The Controller sends a first message to the Model containing the data entered by the user, i.e., "Joe." A data validation rule associated with the "Zip Code" input field is accessed by the Model. Because the "Zip Code" field data validation rule requires that data entered into The "Zip Code" field be numeric data, the Model determines that "Joe" constitutes invalid data and takes appropriate action. For example, the Model may send a second message to the Controller indicating that "Joe" is invalid data for the "Zip Code" field. Subsequently, the Controller sends a third message to the View, causing the View to display a pop-up window visible to the user, containing text such as "Please Enter Numeric Data Only Into the Zip Code Field."

The Model, View, and Controller of an MVC software application may exist on multiple computers. For example, in the foregoing data validation scenario, the View that created a GUI containing the input field labeled "Zip Code" may be embodied by a scripting language program executing on a web browser on a personal computer connected to the Internet and located in a first location. The Model and the Controller may be embodied by one or more high-level language programs executing on a server also connected to the Internet and located in a second location. Thus, the first message (sent from the View to the Model) and the third message (sent from the Controller to the View) travel round trip over the Internet connection from the first location to the second location, and back again.

SUMMARY OF INVENTION

In general, one aspect of the invention involves a method of automating enforcement of a data validation rule associated with an input field by a Model View Controller software application. The method comprises applying an input constraint embodying the data validation rule to a Model to generate an applied constraint, discovering the applied constraint via examination of the Model by a View-Controller Generator to generate a discovered constraint, generating an input field constraint mechanism using the discovered constraint, and constraining the input field using the input field constraint mechanism to generate a constrained input field.

In general, one aspect of the invention involves a method of automating enforcement of a data validation rule associated with an input field by a Model View Controller software application. The method comprises applying an input constraint embodying the data validation rule to a Model to generate an applied constraint, discovering the applied constraint via examination of the Model by a View-Controller Generator to generate a discovered constraint, generating an input field constraint mechanism using the discovered constraint, constraining the input field using the input field constraint mechanism to generate a constrained input field, generating a graphical user interface including the constrained input field, presenting the graphical user interface to a user, and enforcing the data validation rule using the constrained input field.

In general, one aspect of the invention involves a computer system for automating enforcement of a data validation rule associated with an input field by a Model View Controller software application. The computer system comprises a processor, a memory, a computer display, and software instructions stored in the memory for enabling the computer system under control of the processor, to perform applying an input constraint embodying the data validation rule to a Model to generate an applied constraint, discovering the applied constraint via examination of the Model by a View-Controller Generator to generate a discovered constraint, generating an input field constraint mechanism using the discovered constraint, and constraining the input field using the input field constraint mechanism to generate a constrained input field.

In general, one aspect of the invention involves an apparatus for automating enforcement of a data validation rule associated with an input field by a Model View Controller software application. The apparatus comprises means for applying an input constraint embodying the data validation rule to a Model to generate an applied constraint, means for discovering the applied constraint via examination of the Model by a View-Controller Generator to generate a discovered constraint, means for generating an input field constraint mechanism using the discovered constraint, and means for constraining the input field using the input field constraint mechanism to generate a constrained input field Other aspects and advantages of the invention will be apparent from the following description and the appended claims.

DETAILED DESCRIPTION

Figure 1:
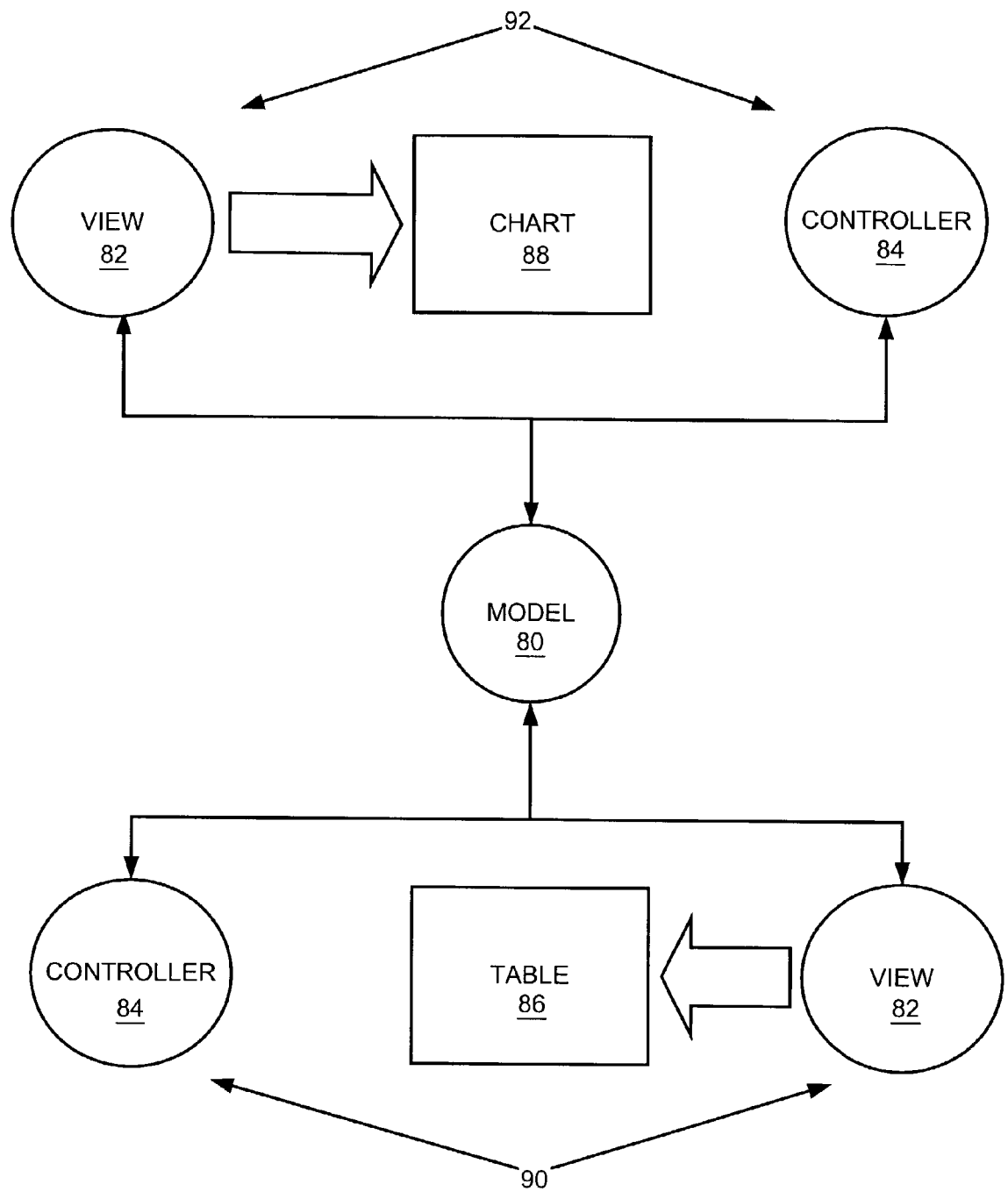
FIG. 1 illustrates an implementation of the Model View Controller design pattern.
Figure 2:
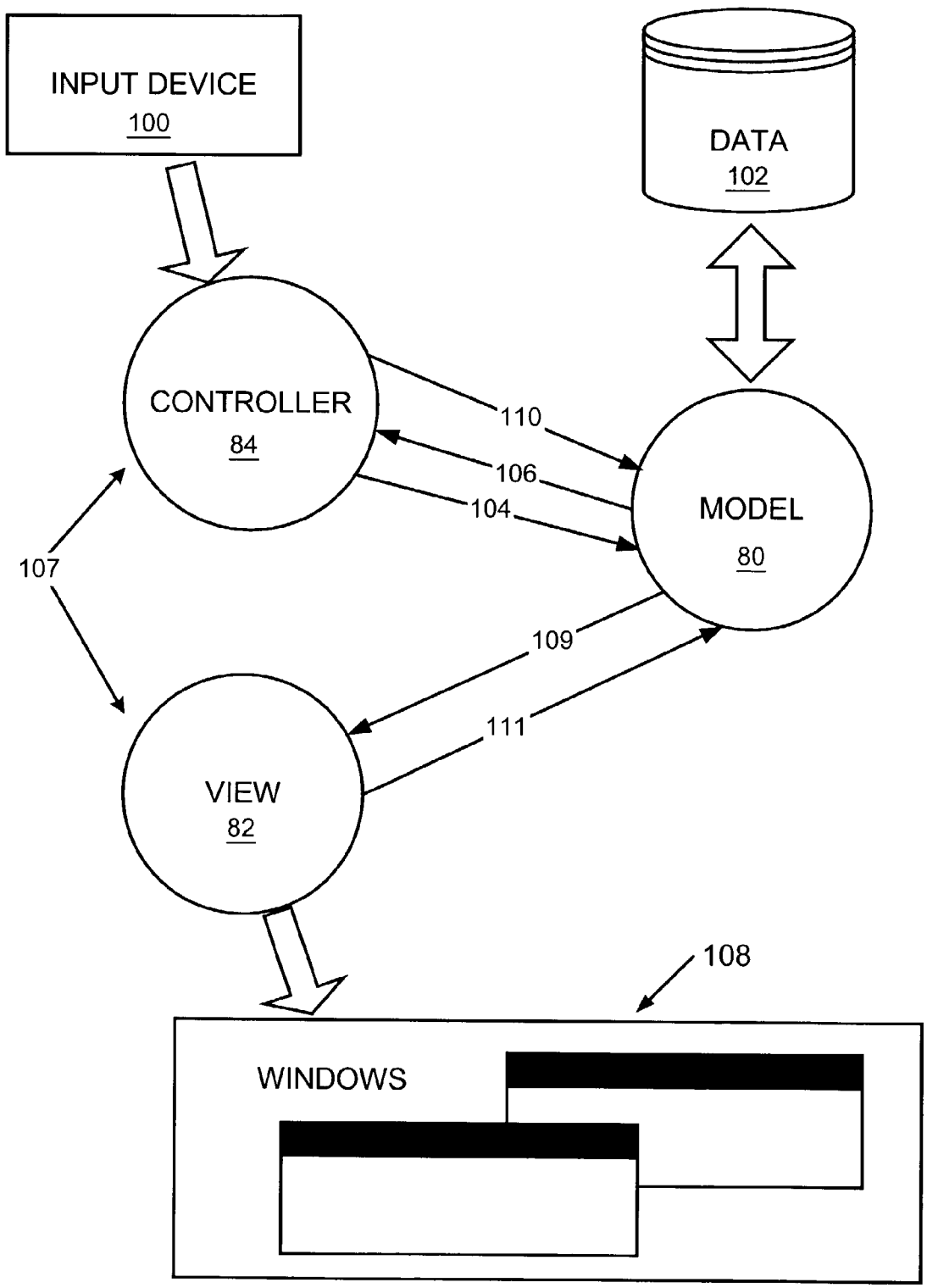
FIG. 2 illustrates a typical sequence of events in an implementation of the Model View Controller design pattern.

Exemplary embodiments of the invention will be described with reference to the accompanying drawings. Like elements in the figures are denoted by like reference numerals for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 3:
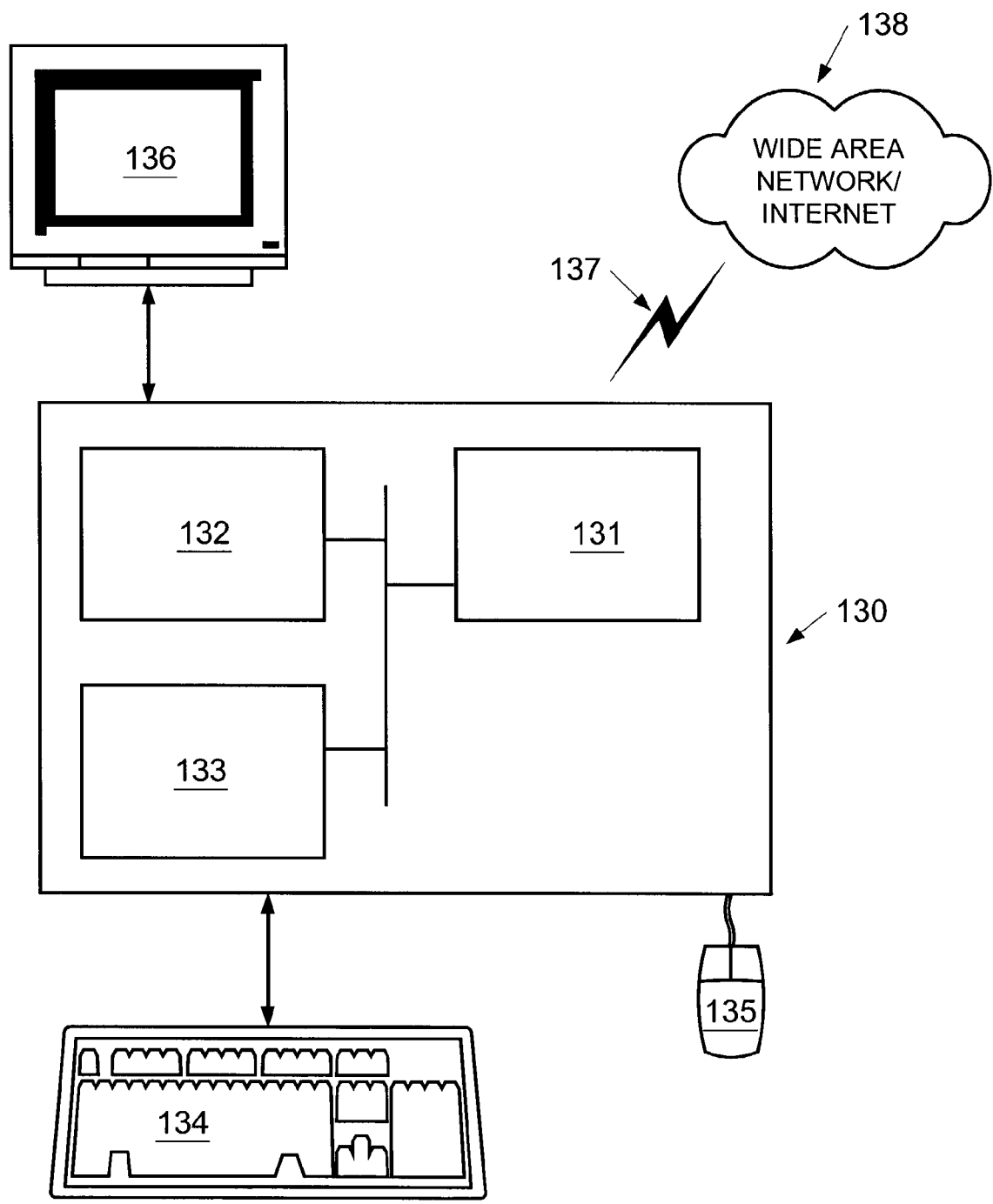
FIG. 3 illustrates a typical networked computer system.

The invention described here may be implemented on virtually any type computer regardless of the platform being used. For example, as shown in FIG. 3, a typical computer (130) has a processor (131), associated memory (132), a storage device (133), and numerous other elements and functionalities typical to today's computers (not shown). The computer (130) has associated therewith input means such as a keyboard (134) and a mouse (135), although in an accessible environment these input means may take other forms. The computer (130) is also associated with an output device such as a display device (136), which may also take a different form in an accessible environment. The computer (130) is connected via a connection means (137) to the Internet (138). The computer (130) is configured to run a virtual machine (not shown), implemented either in hardware or in software.

In one or more embodiments, the invention involves data validation for an MVC software application. Specifically, data validation of data entered into an input field of a GUI is performed by a Controller of the MVC software application. Further, the View creates and/or modifies the GUI in order to accomplish data validation prior to a user interacting with the GUI. An MVC software application able to perform data validation by the Controller is an Interactive MVC (IMVC) software application. In accordance with one or more embodiments of the invention, data validation by the Controller is accomplished by automating creation of the GUI and the Controller to include validation routines corresponding to an input field constraint and an appropriate visual representation of the input field to reflect the input field constraint.

Data validation by the Controller of an IMVC software application is facilitated by the application of a constraint (or set of constraints) to a Model (or Models) of the IMVC software application. The constraint embodies a data validation rule that is associated with an input field (or set of input fields) of the GUI. Because of the construction of classes of the IMVC software application, a constraint applied to the Model (an "applied constraint") is externally visible, i.e., the applied constraint is visible to the View and/or a Controller.

In implementing the invention, multiple arrangements of, and relationships between, classes and objects of Model, View, and Controller are possible. In accordance with one or more embodiments of the invention, a corresponding relationship exists between the Model (or Models) of the IMVC software application and the input field (or set of input fields) of the GUI. Classes derived from the Model class may correspond to input fields of the GUI. For example, the GUI may have an input field for entering a number value (e.g., an integer), and there exists a class derived from the Model class corresponding to the input field. Furthermore, a panel, window, or pane that includes input fields, may have, in accordance with one or more embodiments of the invention, corresponding composite Model classes, which may include nested classes derived from the Model class.

In the IMVC software application, in accordance with one or more embodiments of the invention, data validation rules associated with an input field are embodied by a constraint (or set of constraints) applied to the Model corresponding to the input field. For example, a GUI has an input field for entering integer data (e.g., an account number entry field) having a corresponding Model, e.g., a derived class of the Model class. A data validation rule associated with the account number entry field is embodied by the constraint, and the constraint is applied to the derived class. For example, the data validation rule may state that the account number may be no longer than six digits. Therefore, the constraint (e.g., a LengthConstraint), is applied to the derived class corresponding to the account number entry field, thereby becoming an applied constraint. The applied constraint is visible to the Controller, and thus the Controller may perform data validation using an input field constraint mechanism in order to enforce the data validation rule.

In accordance with one or more embodiments of the present invention, data validation is performed by generating and/or modifying the GUI by including an input field constraint mechanism in the GUI. An input field constraint mechanism may be implemented in multiple forms and/or embodiments. In reference to the example shown above, the input field constraint mechanism may be implemented by creating and/or modifying the GUI so that the account number entry field is only six digits long, and thus would not accept an account number of more than six digits. Thus, data entry into the account number entry field is constrained by the View.

The input field constraint mechanism may include, or entirely consist of, programmatic functionality (i.e., IMVC source code) in order to constrain data entry by the user. An appropriate View and Controller are generated by a View-Controller Generator. In order to constrain data entry into the account number entry field, for example, the View may create a pop-up window that appears if the user tries to enter more than six digits for the account number entry field. Alternatively, the View may create an input mask for the account number entry field, which is presented to the user, and constrains data entry into the account number entry field.

Figure 4:
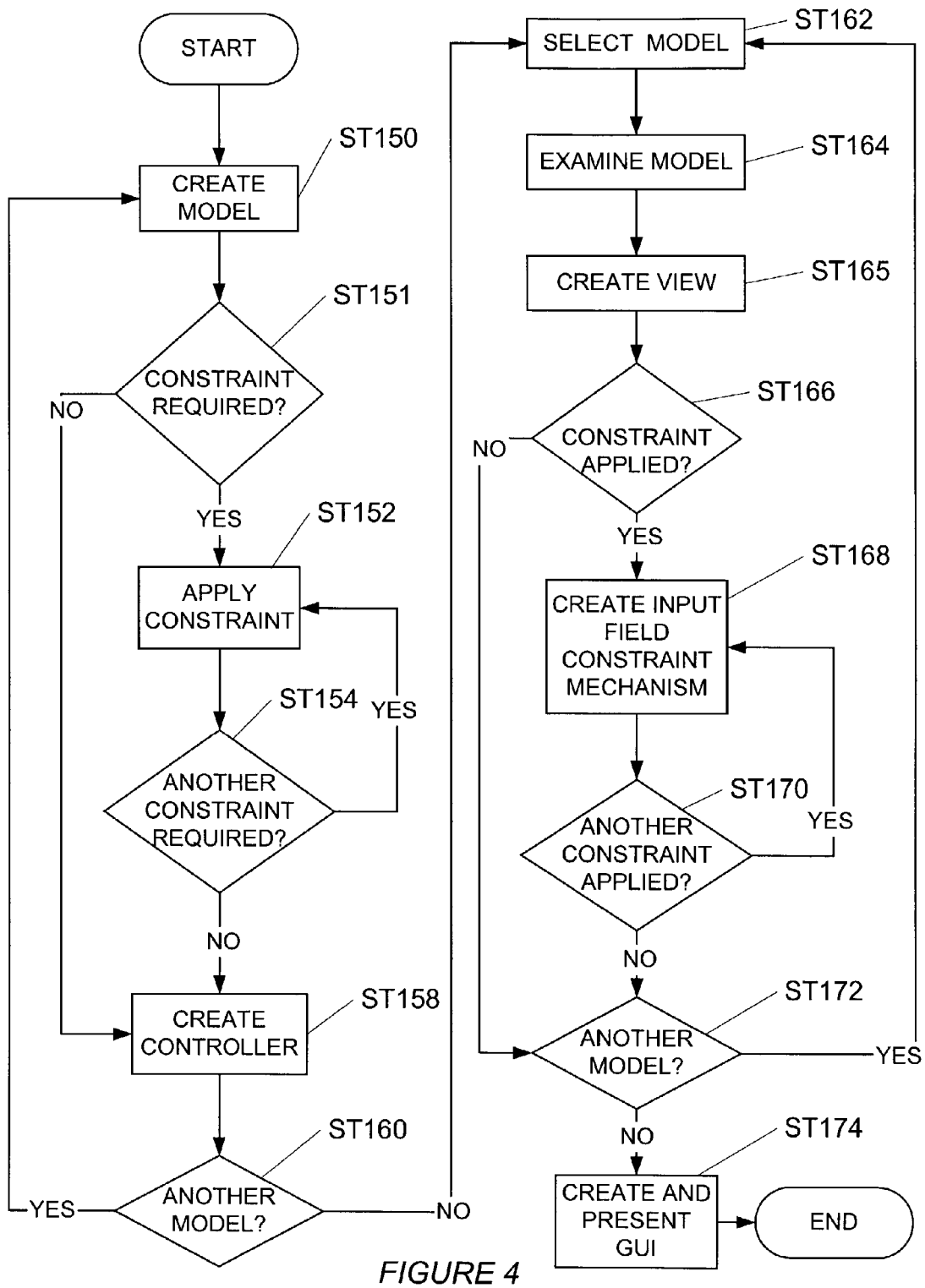
FIG. 4 illustrates a sequence of operations to accomplish data validation of an Interacting Model View Controller software application, in accordance with one or more embodiments of the invention.

FIG. 4 shows a sequence of operations to perform data validation by a View of an IMVC software application. Initially, a Model is created (Step 150). The Model may be a Model class, or a class derived from the Model class. A determination is made as to whether a constraint is required for the Model (Step 151). If a constraint is required, the constraint is applied to the Model (Step 152). A constraint is required if a data validation rule is associated with an input field (or set of input fields) with which the Model corresponds. For example, the Model may correspond to an input field for which a user enters a state of residence (e.g., Texas (TX), California (CA), etc). The data validation rule for the input field may require that the user enter only one of a certain subset of states (e.g., CA, CO, NJ, NY, or PA). In accordance with one or more embodiments of the invention, one or more meta-Models may be used, where constraints are applied to the meta-Model, and are therefore automatically applied to each instance of the associated Model. Thus, creation of the Model may proceed differently than as shown in FIG. 4.

A determination is made as to whether an additional constraint is required (Step 154). If an additional constraint is required, Step 152 is performed. Otherwise, a Controller is created for the Model (Step 158). Once the Controller is created for the Model, a determination is made as to whether another Model requires creation (Step 160). If another Model requires creation, Step 150 is performed.

In accordance with one or more embodiments of the invention, the automated process is initiated when the IMVC software application is executed on a computer. The automated process creates objects of the View and creates input field constraint mechanism. In one or more embodiments of the invention, the automated process uses constructors, or through other standard object-oriented design techniques during the automated process. The result of the automated process is a three-way relationship between three elements of the IMVC software application: the Model, the View, and the Controller, in which the View and the Controller have knowledge of the Model. One skilled in the art will recognize that creation of the objects used in the automated process may be accomplished via multiple techniques, as are widely known to those skilled in the art. In accordance with one or more embodiments of the invention, a possible version of the automated process is discussed below in Step 162 through Step 172 of FIG. 4.

A Model of the IMVC software application is selected (Step 162), and the selected Model is examined by the View-Controller Generator (Step 164). Examining the selected Model allows the discovery of any applied constraints. A View is created by the View-Controller Generator (Step 165), and a determination is made as to whether an applied constraint is discovered (Step 166). For example, if the selected Model is examined by invoking a method, then the method may return a value, which may be tested. Thus, determining whether an applied constraint is discovered may be accomplished by testing the value returned by the method.

If an applied constraint is discovered, an input field constraint mechanism is created (Step 168). Those skilled in the art will realize that enforcement of constraints by the View-Controller Generator is optional. Thus, for every applied constraint discovered, an input field constraint mechanism is not necessarily created, dependent upon a particular implementation of the invention.

The input field constraint mechanism enforces the data validation rule. For example, if the data validation rule requires that the user enter only one of a certain set of states (e.g., CA, CO, NJ, NY, or PA), then the input field constraint mechanism may be implemented by the View via a drop-down list box that includes only the states CA, CO, NJ, NY, or PA as possible choices. Thus, data validation is implicit in the View, and the data validation rule is enforced.

Continuing with the sequence as shown in FIG. 4, a determination is made as to whether another constraint applies to the Model (Step 170). If another constraint applies to the Model, then Step 168 is performed. Otherwise, a determination is made as to whether another Model is included in the IMVC software application (Step 172). If another Model is in the IMVC software application, Step 162 is performed. Otherwise, the View creates a GUI that includes the input field constraint mechanism and presents the GUI to the user (Step 174), and the sequence of operations to perform data validation by a View of an IMVC software application terminates.

One skilled in the art will realize that, in accordance with one or more embodiments of the invention, steps listed above may be fewer or greater in number or may occur in a different sequence.

In accordance with one or more embodiments of the invention, the following source code in the Java™ programming language exemplifies an implementation of an IMVC software application that accomplishes data validation by a View of the MVC software application (as discussed for FIG. 4).

A class derived from the Model class (such as a Person-Model) may be used to represent a person who has personal data, such as name, address, etc. Nested within the Person-Model class are four objects of the StringFieldModel class (name, address, city, and state) that correspond to input fields of a GUI created by the View. Those skilled in the art will realize that objects and classes of the Model may be designed so as to represent abstractions of business entities (e.g., customers, etc.). Therefore, objects such as the four objects of the StringFieldModel class may exist separately from the View, and are thus independent of differing implementations of the View.

The four StringFieldModel objects are incorporated into the PersonModel class as attributes of the PersonModel class:

```
private StringFieldModel name = new StringFieldModel ("name");
private StringFieldModel address = new StringFieldModel
    ("address1")
private StringFieldModel city = new StringFieldModel ("city");
private StringFieldModel state = new StringFieldModel ("state");
```

A set of constraints is applied to the state object (which is an object of the StringFieldModel class). The data validation rule requires that the user enter only one state of a set of possible choices of states (CA, CO, NJ, NY, or PA). First, a String array states is created to hold the set of constraints to be applied to the state object:

```
String [ ] states={"CA", "CO", "NJ", "NY", "PA"};.
```

The set of constraints is applied to the state object (which represents a Model corresponding to an input field of the GUI) via an addConstraint ( ) method, which includes as an argument, a constraint of a type SetConstraint, which takes as an argument, the String array states: state.addConstraint (new SetConstraint (states));.

In one or more embodiments of the invention, the View and the GUI may be created in part with the following JSP™ page:

```
<html>
    <body>
        <m: form>
            <table>
                <tr>
                    <td> <m: label name="person.name" /> </td>
                    <td> <m: field name="person.name" /> </td>
                </tr>
                <tr>
                    <td> <m: label name="person.address1" /> </td>
                    <td> <m: field name="person.address1" /> </td>
                </tr>
                <tr>
```

-continued

```
                    <td> <m: label name="person.city" /> </td>
                    <td> <m: field name="person.city" /> </td>
                </tr>
                <tr>
                    <td> <m: label name="person.state" /> </td>
                    <td> <m: field name="person.state" /> </td>
                </tr>
            </table>
        </m: form>
    </body>
</html>
```

The following source code establishes appropriate properties for a View that uses a servlet:

```
Person.jsp   =/person.jsp;
Person.servlet = person;
```

The following source code provides for creation of an "Enter" button to allow the user to signal that data entry is complete:

```
PersonModel.add(new AbstractAction ("enter") {
    Public String perform(ActionManager manager) {
        //insert code here to perform manipulation of data
        return null;
```

Figure 5:
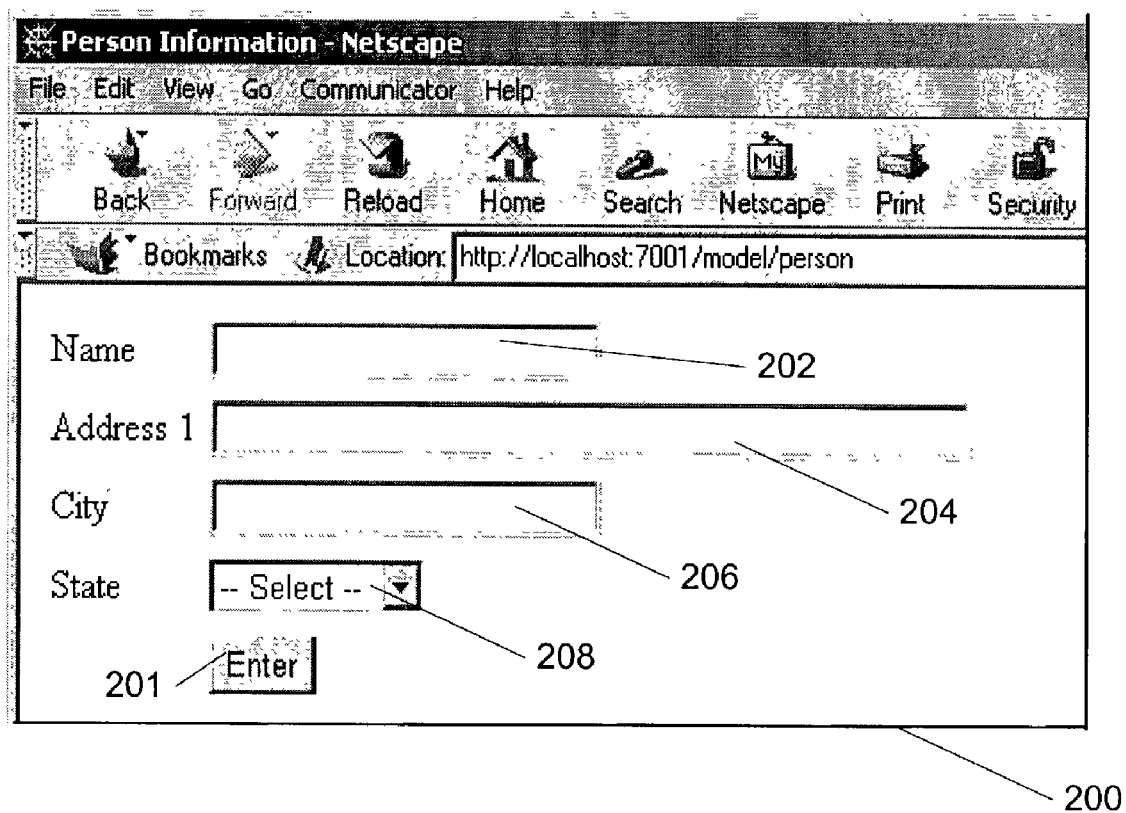
FIG. 5 illustrates a graphical user interface with an input field constrained by a drop-down list box, in accordance with one or more embodiments of the invention.
Figure 6:
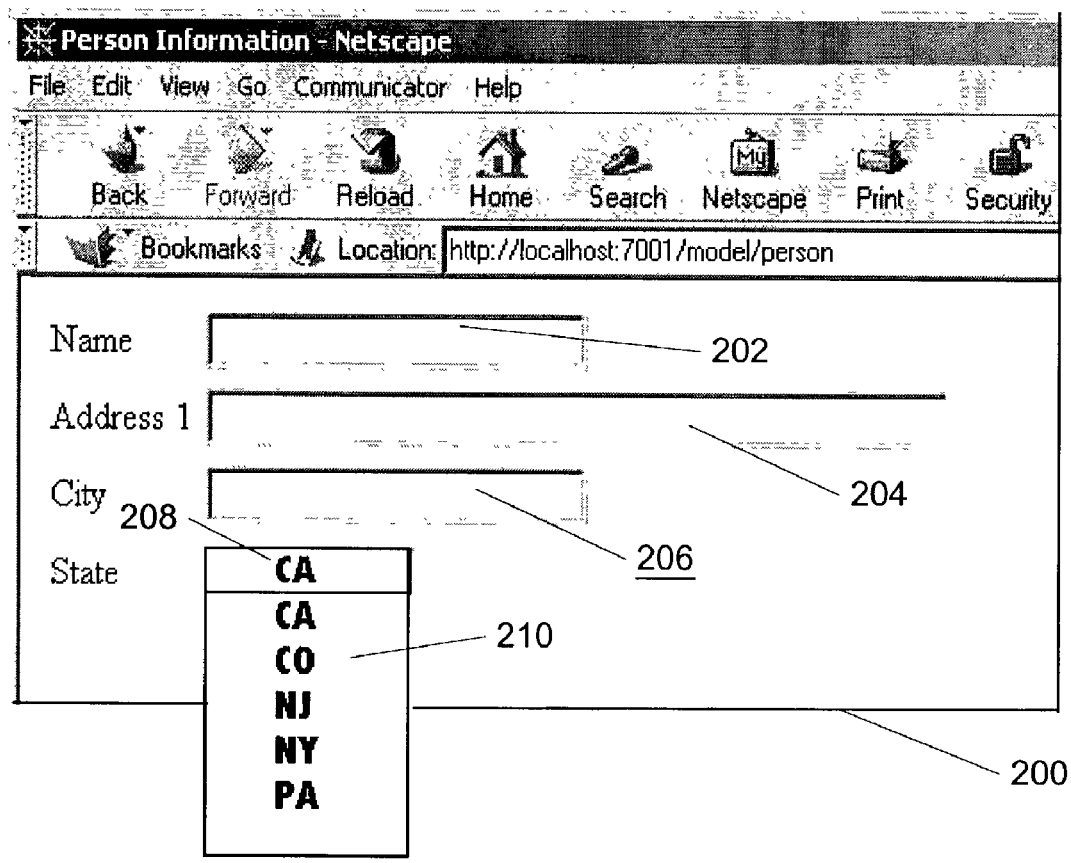
FIG. 6 illustrates a graphical user interface with an expanded drop-down list box, in accordance with one or more embodiments of the invention.

FIG. 5 shows a GUI presented to the user as a result of the source code shown above. The GUI (200), as created by the View of the IMVC software application has an "Enter" button (201), and input fields labeled "Name," (202) "Address 1," (204) "City," (206) and "State" (208). The "State" input field (208) is implemented as a HyperText Markup Language (HTML) Select element. The HTML Select element, when activated by the user (e.g., with a mouse click), displays a drop-down list box, as shown in FIG. 6. The drop-down list box (210) allows the user to only select from a set of possible choices (CA, CO, NJ, NY, or PA).

The View-Controller Generator generates HTML to create the drop-down list box as an input field constraint mechanism in order to enforce the data validation rule associated with the "State" input field (208). The View-Controller Generator is able to generate the HTML because the set of constraints applied to the state stringFieldModel is visible to the View-Controller Generator. One or more objects of the View-Controller Generator is able to send a message or messages to an object or objects of the state StringFieldModel in order to determine the set of constraints applied to the state StringFieldModel. For example, an object of the View-Controller Generator may invoke a method of the state StringFieldModel, as follows:

constraint=state.getConstraint( );.

Those skilled in the art will realize that numerous object-oriented design techniques are available to enable an object of the View to invoke the state.getConstraint ( ) method. Thus, the data validation rule is enforced by the input field constraint mechanism, and data validation is performed by the View of the IMVC software application. In accordance with one or more embodiments of the invention, data validation performed by the View is also performed by other components of the invention, e.g., the Model and the Controller.

Those skilled in the art will realize that other constraints and input field constraint mechanisms may be employed by the invention. For example, other possible constraints applied to input fields relate to input field length, input field range of acceptable values, and digits or characters as allowable input. An input mask may be used as an input field constraint mechanism. Also, a constraint may be applied to a Model in order to mandate that the user enter data for a corresponding input field (a MandatoryConstraint). Other constraints may include, for example, an AllConstraint constraint (where the user is required to enter data in each input field), a AllOrNoneConstraint constraint (where the user is required to either enter data into each of the input fields, or not enter data into any of the input fields), and a AtLeastOneConstraint constraint (where the user is required to enter data into at least one nominated input field). In order to generate an input field constraint mechanism for the preceding constraints, the View may generate, for example, Javascript™ source code to generate a pop-up window via a web browser, which appears when the user fails to adhere to a data validation rule associated with a constrained input field. Regular expression constraints may also be enforced, in accordance with one or more embodiments of the invention.

Advantages of the present invention may include one or more of the following. An IMVC software application provides functionality for creating software applications organized in a Model View Controller design pattern that allow constraints to be applied to a Model. The constraints are visible to a View and a Controller, thereby allowing the View to discover in advance (before the user inputs data into a constrained input field or other constrained user interface input) what constraints are applied to the Model corresponding to the constrained input field. Thus, client side validation of user-input data is accomplished.

Client side validation eliminates the need for a roundtrip for the data entered by the user. Therefore, in a client-server environment, the data entered into the constrained input field by the user is not required to travel to the server, where the data is validated by the Model, and then travel back to the client side, where the user is located. As a result, client side validation may save the user time and reduce the need for additional computational resources.

The invention may provide for reduction of maintenance needs resulting from validation rules being repeatedly coded in different parts of a system (e.g., in an HTML browser client, a Wireless Application Protocol (WAP) client, a Java 2 Micro Edition (J2ME)™ client, a web service, a business service, etc.). A further advantage of the invention is that data validation rules may be written in a way that is independent of actual implementation. For example, the SetConstraint constraint (which gave a set of 5 states) shown in a previous example, does not specify how the constraint is to be represented. In a particular implementation that uses HTML, for example, the constraint is represented as a <SELECT>statement. However, in an implementation using a Java™-based GUI, the constraint may appear as a Combo box.

The invention is platform and language-independent, and thus may be employed in conjunction with a variety of client-side validation mechanism, such as client-side scripting languages to further enhance user experience. For example, the View may create a GUI using various technologies, such as HTML, Extensible Hypertext Markup Language, (XHTML), Wireless Markup Language (WML), and Extensible Markup Language (XML), or other markup languages or data exchange methods, in conjunction with various server side technologies, such as servlets. Furthermore, the invention may be implemented on an IMVC software application that runs on a single computer, which displays information directly to a local computer monitor screen, or other display device. Those skilled in the art will appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for automating enforcement of a data validation rule associated with an input field by a Model View Controller software application, comprising:
    applying an input constraint embodying the data validation rule to a Model to generate an applied constraint, wherein the applied constraint comprises the data validation rule and is externally visible to a View, a Controller, and a View-Controller Generator;
    generating the View and the Controller by the View-Controller Generator;
    discovering the applied constraint via examination of the Model by the View-Controller Generator to generate a discovered constraint;
    generating an input field constraint mechanism in a markup language by the View-Controller Generator using the discovered constraint; and
    constraining the input field using the input field constraint mechanism to generate a constrained input field, wherein the View performs at least one selected from the group consisting of:
    generating the constrained input field prior to user interaction with the constrained input field, and
    modifying the constrained input field prior to user interaction with the constrained input field.

2. The method of claim 1, the input constraint comprising a set of constraints.

3. The method of claim 1, the input field constraint mechanism comprising a drop-down list box.

4. The method of claim 1, the input field constraint mechanism comprising an input mask.

5. The method of claim 1, the input field constraint mechanism comprising software application source code.

6. The method of claim 1, the input field constraint mechanism comprising presenting a popup window triggered by user interaction with the constrained input field.

7. The method of claim 1, wherein the View and the Controller are generated using the Model and an automated process.

8. The method of claim 1, further comprising:
    generating a graphical user interface including the constrained input field; and presenting the graphical user interface to a user.

9. The method of claim 8, further comprising:
    modifying the graphical user interface using the input field constraint mechanism.

10. The method of claim 1, further comprising:
    enforcing the data validation rule using the constrained input field.

11. A method for automating enforcement of a data validation rule associated with an input field by a Model View Controller software application, comprising:
- applying an input constraint embodying the data validation rule to a Model to generate an applied constraint, wherein the applied constraint comprises the data validation rule and is externally visible to a View, a Controller, and a View-Controller Generator;
- generating the View and the Controller by the View-Controller Generator;
- discovering the applied constraint via examination of the Model by the View-Controller Generator to generate a discovered constraint;
- generating an input field constraint mechanism in a markup language by the View-Controller Generator using the discovered constraint; and
- constraining the input field using the input field constraint mechanism to generate a constrained input field, wherein the View performs at least one selected from the group consisting of:
  - generating the constrained input field prior to user interaction with the constrained input field, and
  - modifying the constrained input field prior to user interaction with the constrained input field;
- generating a graphical user interface including the constrained input field; presenting the graphical user interface to a user; and
- enforcing the data validation rule using the constrained input field.

12. A computer system for automating enforcement of a data validation rule associated with an input field by a Model View Controller software application, comprising:
- a processor;
- a memory;
- a computer display; and
- software instructions stored in the memory for enabling the computer system under control of the processor, to perform:
  - applying an input constraint embodying the data validation rule to a Model to generate an applied constraint wherein the applied constraint comprises the data validation rule and is externally visible to a View, a Controller, and a View-Controller Generator;
  - generating the View and the Controller by the View-Controller Generator;
  - discovering the applied constraint via examination of the Model by the View-Controller Generator to generate a discovered constraint;
  - generating an input field constraint mechanism in a markup language by the View-Controller Generator using the discovered constraint; and
  - constraining the input field using the input field constraint mechanism to generate a constrained input field, wherein the View performs at least one selected from the group consisting of:
    - generating the constrained input field prior to user interaction with the constrained input field, and
    - modifying the constrained input field prior to user interaction with the constrained input field.

13. The computer system of claim 12, the input constraint comprising a set of constraints.

14. The computer system of claim 12, the input constraint comprising a drop-down list box.

15. The computer system of claim 12, the input constraint comprising an input mask.

16. The computer system of claim 12, the input constraint comprising software application source code.

17. The computer system of claim 12, the input constraint comprising presenting a popup window triggered by user interaction with the constrained input field.

18. The computer system of claim 12, wherein the View and the Controller are generated using the Model and an automated process.

19. The computer system of claim 12, further comprising:
- generating a graphical user interface including the constrained input field; and
- presenting the graphical user interface to a user.

20. The computer system of claim 19, further comprising:
- modifying the graphical user interface using the input field constraint mechanism.

21. An apparatus for automating enforcement of a data validation rule associated with an input field by a Model View Controller software application, comprising:
- means for applying an input constraint embodying the data validation rule to a Model to generate an applied constraint, wherein the applied constraint comprises the data validation rule and is externally visible to a View, a Controller, and a View-Controller Generator;
- means for generating the View and the Controller by the View-Controller Generator;
- means for discovering the applied constraint via examination of the Model by the View-Controller Generator to generate a discovered constraint;
- means for generating an input field constraint mechanism in a markup language by the View-Controller Generator using the discovered constraint; and
- means for constraining the input field using the input field constraint mechanism to generate a constrained input field, wherein the View performs at least one selected from the group consisting of:
  - generating the constrained input field prior to user interaction with the constrained input field, and
  - modifying the constrained input field prior to user interaction with the constrained input field.

* * * * *